(12) United States Patent
Klein et al.

(10) Patent No.: US 11,249,465 B2
(45) Date of Patent: Feb. 15, 2022

(54) METHOD, DEVICE AND MANAGEMENT SYSTEM FOR CHECKING A ROUTE FOR A MOBILE TECHNICAL SYSTEM IN A BUILDING

(71) Applicant: Siemens Schweiz AG, Zürich (CH)

(72) Inventors: Wolfram Klein, Neubiberg (DE); Hermann Georg Mayer, Prien am Chiemsee (DE); Christian Frey, Unterägeri (CH)

(73) Assignee: SIEMENS SCHWEIZ AG

( * ) Notice: Subject to any disclaimer, the term of this patent is extended or adjusted under 35 U.S.C. 154(b) by 195 days.

(21) Appl. No.: 16/558,513

(22) Filed: Sep. 3, 2019

(65) Prior Publication Data

US 2020/0073374 A1 Mar. 5, 2020

(30) Foreign Application Priority Data

Sep. 3, 2018 (DE) .................... 10 2018 214 927.5

(51) Int. Cl.
*G05B 19/418* (2006.01)
*G08G 1/0968* (2006.01)
*G05D 1/02* (2020.01)

(52) U.S. Cl.
CPC ..... *G05B 19/41895* (2013.01); *G08G 1/0968* (2013.01); *G05B 2219/31003* (2013.01)

(58) Field of Classification Search
USPC ....................................................... 701/400
See application file for complete search history.

(56) References Cited

U.S. PATENT DOCUMENTS

| 10,900,790 | B2* | 1/2021 | Jachym | G06T 17/05 |
| 2014/0032179 | A1* | 1/2014 | Solihin | G06F 30/13 703/1 |
| 2014/0277728 | A1* | 9/2014 | Miller | G05D 1/0236 700/258 |
| 2014/0323148 | A1* | 10/2014 | Schmalstieg | G01C 21/20 455/456.1 |
| 2017/0255198 | A1* | 9/2017 | Rodriguez | G05D 1/0088 |
| 2018/0328737 | A1* | 11/2018 | Frey | G01C 21/3667 |
| 2020/0073374 | A1* | 3/2020 | Klein | G05B 19/41895 |

FOREIGN PATENT DOCUMENTS

| EP | 2806324 A1 | 11/2014 |
| WO | 2018054659 A1 | 3/2018 |
| WO | WO 2018054659 A1 | 3/2018 |

* cited by examiner

*Primary Examiner* — Tyler D Paige
(74) *Attorney, Agent, or Firm* — Schmeiser, Olsen & Watts LLP

(57) ABSTRACT

Provided is a computer-implemented method for checking a route in a building for a mobile technical system, wherein a computer-aided spatial model of the building, a route for the mobile technical system in the building and parameters of the mobile technical system are read in, a boundary condition for the route is derived depending on the parameters, for a predefined point of the route on the basis of the model of the building a check is made to ascertain whether the building data satisfy the boundary condition at the predefined point of the route, and a result of the check is output. Also provided is a device, a management system, a computer program product and a computer-readable data carrier.

13 Claims, 5 Drawing Sheets

Figure 1:
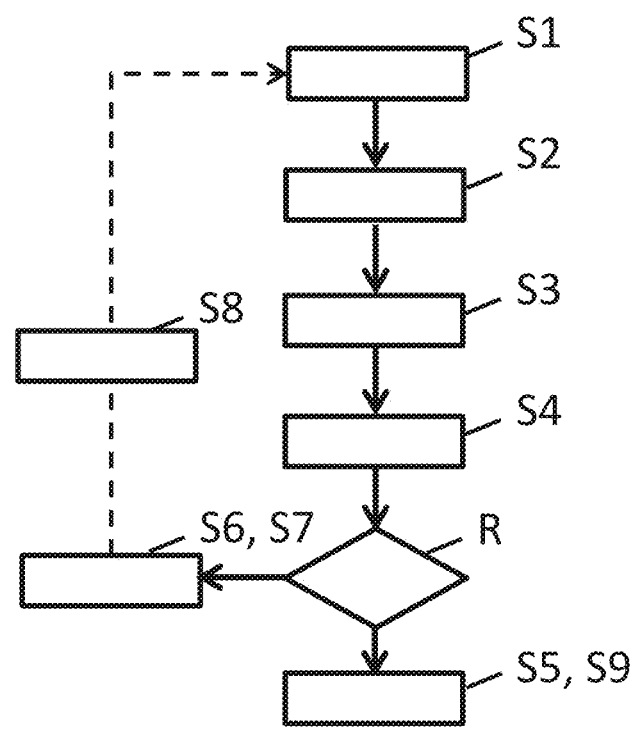

METHOD, DEVICE AND MANAGEMENT SYSTEM FOR CHECKING A ROUTE FOR A MOBILE TECHNICAL SYSTEM IN A BUILDING

CROSS-REFERENCE TO RELATED APPLICATION

This application claims priority to German Application No. 10 2018 214 927.5, having a filing date of Sep. 3, 2018, the entire contents of which are hereby incorporated by reference.

FIELD OF TECHNOLOGY

The following relates to a computer-implemented method and to a device for checking a route for a mobile technical system in a building. Furthermore, the invention relates to a management system of a building, to a computer program product, and to a computer-readable storage medium.

BACKGROUND

In buildings, such as e.g. production plants, industrial plants, hospitals, airports or the like, mobile technical systems, such as e.g. transport systems, are increasingly being used for operation, service and/or logistics. These mobile systems may be guided by human beings or controlled by means of a control device and may also be designed to be autonomous. It is known here to determine paths for a mobile system in a building by means of path planning and/or optimization algorithms, for example. In general, only boundary conditions of the building, such as e.g. walls or passageways, are taken into account in path planning.

It is furthermore known to provide a simulation model by means of building data modeling (referred to as building information modeling, BIM for short) for a building for the purpose of predicting and checking specific features and for assisting decisions. A simulation model can comprise, in particular, information about technical data and/or statics of the building. On the basis of such a simulation model, a simulation can be carried out for example for a static installation in the building. In general, a simulation model and/or sensor data of a building can be managed by means of a building management system.

SUMMARY

An aspect relates to checking a route of a mobile technical system in a building in respect of suitability for the mobile technical system.

In accordance with a first aspect, embodiments of the invention relate to a computer-implemented method for checking a route in a building for a mobile technical system, wherein
 a computer-aided spatial model of the building, comprising building data, a route for the mobile technical system in the building and parameters of the mobile technical system are read in,
 a boundary condition for the route is derived depending on the parameters,
 for a predefined point of the route on the basis of the model of the building a check is made to ascertain whether the building data satisfy the boundary condition at the predefined point of the route,
 and
 a result of the check is output.

A mobile technical system is, in particular, movable or mobile and can be for example a mobile transport system, a mobile robot, or a vehicle, which is configured to be autonomous or can be moved or controlled by a human being. Parameters of a mobile technical system can be, in particular, technical and physical parameters, such as e.g. dimensions, weight, heat resistance, radius of turning circle and the like. Furthermore, the parameters of the mobile technical system can also comprise information about a load, such as e.g. bulkiness, or particular requirements made of the transport path.

Unless indicated otherwise in the following description, the terms "determine", "carry out", "provide", "effect", "calculate", "computer-aided", "compute", "establish", "generate", "configure", "reconstruct" and the like relate to actions and/or processes and/or processing steps which alter and/or generate data and/or convert the data into other data, wherein the data can be represented or be present as physical variables, in particular. In particular, data of a model of a building, of a route and/or parameters of the mobile technical system can be stored on a storage unit and/or be read in. A "route" for a mobile technical system is, in particular, an indication about a path to be followed, wherein at least a start point and an end point are indicated. A route can be stored in a data structure. A route can for example be predefined by a user or determined by means of a path planning algorithm for the building.

A computer-aided spatial model of a building, also referred to hereinafter as building model, can comprise or model physical and/or technical and/or functional building data, in particular. A model of a building can be a digital, three-dimensional simulation model that renders physical variables and technical features of the building, in particular. By way of example, a model of a building can comprise a plan, dimensions, information concerning statics and/or concerning construction materials. By way of example, the method can be used to check whether, at a positional point of a route, a supporting framework of the building is suitable for the weight of the mobile technical system. For this purpose, it is possible, in particular, to carry out a computer-aided simulation of the route in the building.

The building data can be, in particular, physical and/or technical and/or functional data of the building, such as e.g. data concerning size, material, or loading capacity of parts of the building, and information concerning building plans and functional details.

In connection with the invention, "computer-aided" can be understood to mean, for example, an implementation of the method in which, in particular, a processor performs at least one method step of the method.

A boundary condition can be regarded, in particular, as a requirement which restricts a solution space beyond what is necessary to satisfy functional requirements and/or quality requirements. The boundary condition can be derived, i.e. calculated or simulated, for example, on the basis of the parameters of the mobile technical system, in particular.

One advantage of embodiments of the invention is that predefined routes or predefined points, i.e. positional points, of a route in a building for a mobile technical system can be checked, on the basis of a model of the building, in respect of suitability for the mobile technical system as to whether they satisfy the conditions of the building and/or of the mobile technical system. In connection with the invention, "suitability" can be understood to mean, in particular, also utilizability, performability, implementability, usability, applicability, fitness, employability, suitableness, navigability, or deployability. In particular, the check of a route to ascertain whether it is suitable for a mobile technical system can be carried out for more than one predefined point. In particular, for every point of the route a check can be made to ascertain whether the boundary condition is satisfied at the corresponding location in the building.

A check is effected for example on the basis of a comparison of loading limits of the building and a weight of the mobile technical system at a predefined point of the route in the building. In this regard, by way of example, a route of a mobile technical system can be checked in respect of implementability on the basis of the building model before the route is navigated. In particular, it is possible to check more than one route for a mobile technical system in this way and to select a suitable route.

In one advantageous embodiment of the computer-implemented method, depending on the result of the check
the route or at least parts of the route for the mobile technical system can be released and/or
a warning message can be output and/or
the mobile technical system can be stopped and/or
planning of an alternative route can be instigated and/or
an alternative route can be output.

In particular, it is possible to define rules and/or stipulations and/or uncertainty ranges and/or danger zones relative to a transported product, on the basis of which the result of the check can be classified. By way of example, replanning of the route or of a part of the route can be instigated by feedback being communicated to coupled path planning software, which instigates alternative planning of the route. By way of example, a check may reveal that only slow navigation of a route is possible, such that the route for the mobile technical system is released with a warning. In the case of a negative checking result, by way of example, the mobile technical system can be stopped, switched off, braked or diverted.

In a further advantageous embodiment of the computer-implemented method, the mobile technical system and a management system of the building can be coupled via a communication connection and data can be exchanged via the communication connection.

One advantage of embodiments of the invention is that a management system of the building, such as e.g. a building management system, can be coupled to the mobile technical system in such a way that data can be exchanged. The management system of the building can thus be coupled in particular directly to a control unit of the mobile technical system by way of a wireless or wired connection.

In a further advantageous embodiment of the computer-implemented method, current ambient data in the building can be detected by a sensor and the current ambient data can be communicated to the management system of the building and the ambient data can be verified with building data and/or taken into account when checking the route.

A sensor can be fitted for example on or in the building or on the mobile technical system. By way of example, current ambient data in the building can be detected by means of a laser scan. Ambient data can comprise, for example, measurement data from various sensors, such as e.g. temperature sensors, strain sensors, smoke detectors or load sensors, which can be installed in or on the building. In connection with the invention, the current ambient data can be regarded in particular as additional conditions for path validation, such as e.g. current temperature data for refrigerated transport. By way of example, a route for a mobile technical system can thus be checked in respect of suitability in almost real time. The ambient data can be acquired continuously or at predefined measurement times, can be compared with predefined building data, thus verified, and utilized for checking the route.

In a further advantageous embodiment of the computer-implemented method, data of the mobile technical system can be detected by a sensor and these data of the mobile technical system can be communicated to the management system and the data of the mobile technical system can be taken into account when checking the route.

The at least one sensor can in particular be installed on the mobile technical system or be coupled thereto. The sensor can also be installed in the building and monitor the mobile technical system in this way. The sensor data about the mobile technical system can comprise operating data, movement data and/or location data, for example. On the basis of these sensor data, the parameter data of the mobile technical system can be updated, such as e.g. by means of a continuous measurement of the total weight of a transport system. On the basis of the current sensor data of the mobile technical system, the path for the system can be verified in real time. It is also possible that, by means of a sensor coupled to the mobile technical system, dynamic, i.e. temporally variable, data of the building are detected and communicated to the management system of the building and utilized for checking a route.

In a further advantageous embodiment of the computer-implemented method, checking the route can be carried out in the management system of the building or on the mobile technical system and the result of the check can be communicated to the management system of the building and/or by the mobile technical system and can be output thereby.

For an autonomous mobile technical system, such as e.g. an autonomous mobile system, the check in respect of suitability of a route can be carried out directly on the system. For a fleet of similar mobile technical systems, a route validation can advantageously be carried out centrally by the management system of the building. For a mobile technical system guided by a human being, the checking of a route can be carried out directly on the mobile technical system, wherein the checking result can be output locally as a message, e.g. as a warning signal.

In a further advantageous embodiment of the computer-implemented method, a computer-aided spatial model of the building can be generated from a non-computer-aided model of the building and can be provided.

In particular, older building plans or architectural drawings can be converted into computer-aided models of the building.

In accordance with a further aspect, embodiments of the invention relate to a device for checking a route in a building for a mobile technical system, comprising:
an input module for reading in a computer-aided spatial model of the building, comprising building data, a route (W) for the mobile technical system in the building and parameters of the mobile technical system,
a deriving module for deriving a boundary condition for the route depending on the parameters,
a checking module for checking for a predefined point of the route on the basis of the model of the building that the building data satisfy the boundary condition at the predefined point of the route,
an output module for outputting the result of the check.

The device and/or the modules of the device can be configured in particular as hardware and/or software modules.

In one advantageous embodiment, the device can be coupled to a management system of a building and/or to the mobile technical system.

In particular, the device can be understood as part of the management system of the building and/or be coupled directly to a control unit of the mobile technical system.

In one advantageous embodiment, the device can be configured so as to carry out steps of a computer-implemented method according to the invention.

The device can comprise, in particular, at least one processor which carries out at least one step of a computer-implemented method according to the invention.

In accordance with a further aspect, the invention relates to a management system of a building, wherein the management system comprises a device according to the invention.

A management system of a building can be coupled to the building, in particular.

In one advantageous embodiment, the management system can be coupled to at least one sensor and/or to the mobile technical system via a communication connection and can be configured so as to carry out the steps of a method according to the invention.

Furthermore, the invention relates to a computer program product (non-transitory computer readable storage medium having instructions, which when executed by a processor, perform actions) which is loadable directly into a programmable computer, comprising program code parts suitable for carrying out the steps of a method according to the invention, and to a computer-readable data carrier on which the computer program product is stored.

In particular, a computer program product according to the invention can be provided by a network service, a computer system, a server system, a distributed computer system, a cloud-based computer system and/or virtual computer system. The providing can be effected for example as a download in the form of a program data block and/or an instruction data block, as a file, in particular as a download file, of the complete computer program product. Such a computer program product is read in for example using a providing device, in particular in the form of a computer-readable data carrier, and executes the program instructions, such that the method according to the invention is performed on a computer.

The following exemplary embodiments, unless indicated otherwise or already indicated, can comprise at least one processor and/or a storage unit in order to implement or perform the method.

BRIEF DESCRIPTION

Figure 2:
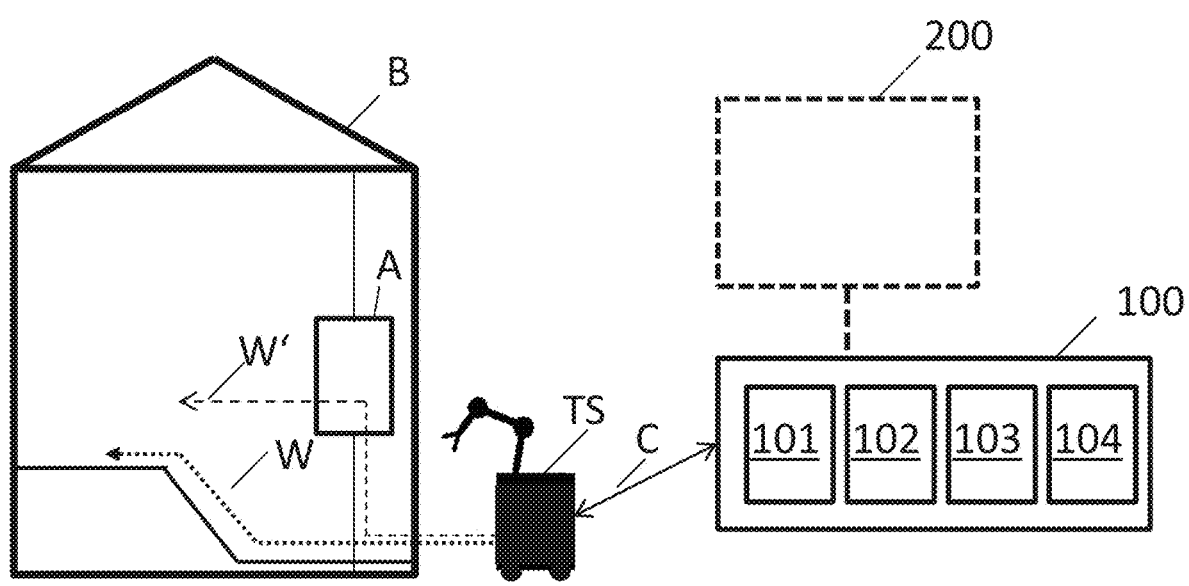
Figure 3:
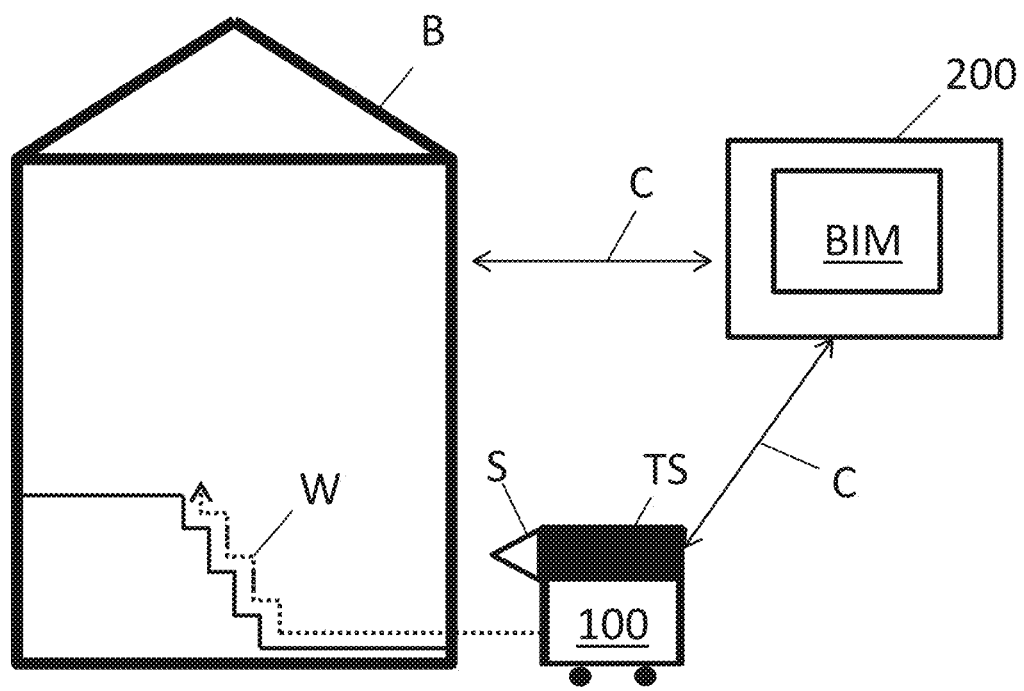
Figure 4:
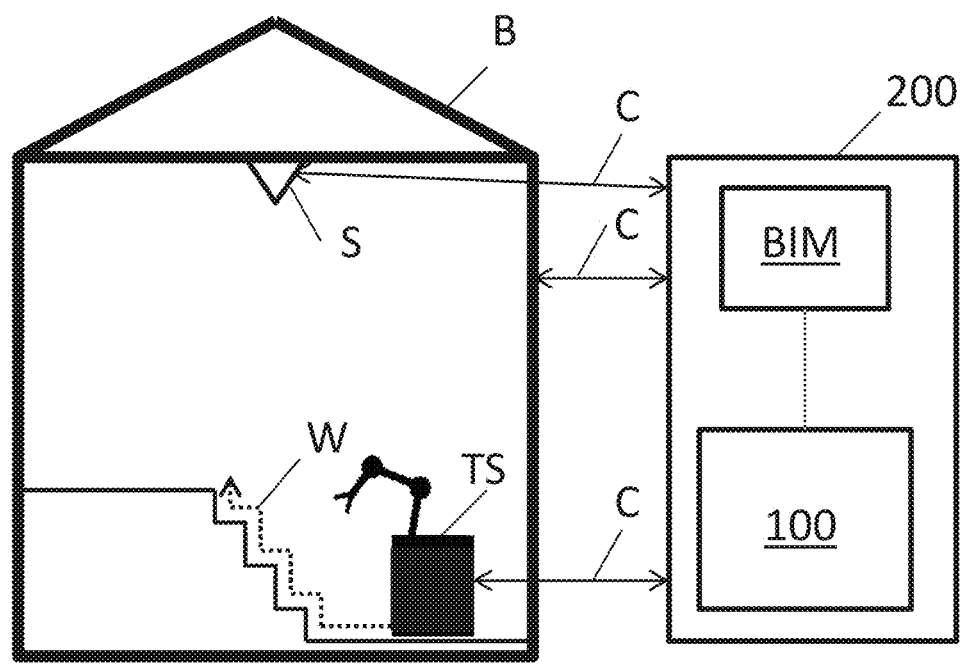
Figure 5:
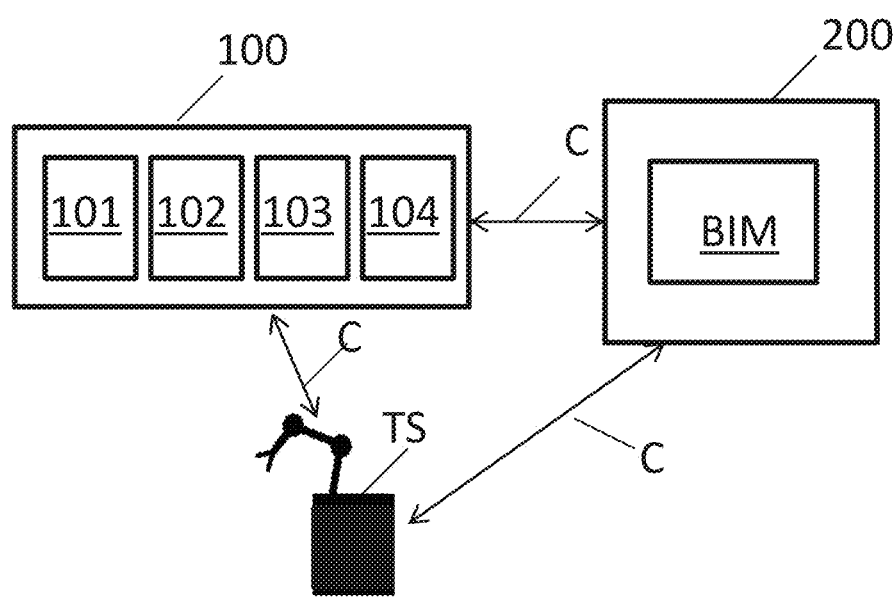

Some of the embodiments will be described in detail, with references to the following Figure, wherein like designations denote like members, wherein:

FIG. 1: shows a flow diagram of a method according to the invention;

FIG. 2: shows a schematic illustration of a method according to the invention;

FIG. 3: shows a further schematic illustration of a method according to the invention;

FIG. 4: shows a schematic illustration of a method according to the invention; and FIG. 5: shows a schematic illustration of a device according to the invention and of a management system according to the invention.

DETAILED DESCRIPTION

Mutually corresponding parts are provided with the same reference signs in all of the figures.

FIG. 1 shows a flow diagram of a method according to the invention for the computer-aided checking, in particular checking in respect of suitability, of a route for a mobile technical system in a building.

Step S1 involves reading in a computer-aided spatial model of the building, such as e.g. a three-dimensional simulation model, indications concerning a route in the building for the mobile technical system and parameters of the mobile technical system. By way of example, this information is read in as data from a database or storage unit. The route can in particular be predefined by a user and/or determined and provided by means of suitable path planning software. The building model comprises physical and/or technical and/or functional properties of the building. Non-computer-aided models or the building, such as e.g. architectural drawings, can be converted into a computer-aided model of the building, wherein in particular physical and/or technical and/or functional building data of the building are acquired and modeled in a simulation model.

In step S2, boundary conditions for the route in the building can be derived on the basis of the parameters of the mobile technical system. "Derive" can be understood to mean for example "determine", "calculate", "obtain", "ascertain", "restrict", "elicit", "conclude", "draw a conclusion", "infer", "deduce", or the like. By way of example, on the basis of dimensional specifications or safety information assigned to the mobile technical system, it is possible to ascertain requirements that have to be satisfied in order to navigate the route. The parameters can comprise specific features of the mobile technical system, such as e.g. weight, size of the turning circle, safety provisions or information about a transported product, such that boundary conditions comprise for example load, size or safety limitations. In order that a route for a mobile technical system can be validated, the building data have to satisfy the boundary conditions along the predefined positional points of the route.

In step S3, on the basis of the spatial model of the building and depending on the parameters of the mobile technical system, every predefined positional point of the route can be checked in respect of suitability for the mobile technical system. The check can comprise for example a comparison of the boundary condition with corresponding building data at a predefined positional point, such as e.g. a height comparison of a ceiling height of the building with the dimensions of the mobile technical system. By way of example, in this way it is possible to check whether a predefined route, or at least one part of the route at predefined positional points of the route, is suitable for the mobile technical system, i.e. whether the building data at the respective positional point satisfy the boundary conditions of the mobile technical system and thus allow the route to be navigated. Positional information of the building model with positional information of the route is utilized for the check. The boundary conditions for the route are of technical and/or physical and/or functional nature, in particular, and are derived from the parameters of the mobile technical system.

In particular, on the basis of the building model, it is possible to carry out a simulation of the route in the building and thus to check the suitability of the route for the mobile technical system. The checking can be effected on the basis of predefined rules, for example.

Consequently, a predefined route in the building can be verified explicitly for the mobile technical system by, in particular, physical and/or technical properties of the building being taken into consideration.

Step S4 involves outputting the result of the check of the route to the mobile technical system and/or to the management system of the building. The result of the check of the route may reveal, for example, that the route for the mobile technical system in the building is suitable, or is suitable only under specific conditions, or is not suitable.

The check of the route can be effected directly on a processor on the mobile technical system. Alternatively, the check can also be carried out by a management system of the building, wherein for this purpose in particular parameters of the mobile technical system are communicated to the management system.

Further steps of the method are effected depending on the checking result R. By way of example, a route may be found to be suitable for a mobile technical system and be released, step S5. Once the route has been released, the route can be navigated or implemented by the mobile technical system. By way of example, the release of the route can be communicated to a control device of the mobile technical system.

In the case of a negative checking result, i.e. if the route or at least one part of the route is found not to be suitable for the mobile technical system, the path cannot be released and/or a warning message can be output, step S6, and/or the mobile technical system can be stopped, step S7. In addition, in the case of a negative checking result, planning of an alternative route can be instigated, step S8. This alternative route can subsequently be checked according to embodiments of the invention, on the basis of the building model and depending on the parameters of the mobile technical system, as to whether all required boundary conditions for navigating the route are satisfied, steps S1 to S4. In the case of a positive checking result for the alternative route, the latter can be communicated to the mobile technical system and/or to the management system of the building and be implemented by the mobile technical system, step S9.

FIG. 2 shows one exemplary embodiment of a method according to embodiments of the invention. A building B is shown schematically, in which a route W for a mobile technical system TS is predefined. The mobile technical system TS can be a mobile robot, for example, which is intended to move along a specific route W to a next storey in the building B. The route W can be planned by means of a path planning algorithm, for example. In order to check whether the route is suitable for the mobile robot TS, e.g. whether a ramp withstands a total weight of the mobile robot TS, according to embodiments of the invention the route is simulated and validated by means of a model of the building. On the basis of at least one parameter of the mobile robot, e.g. the total weight, at least one boundary condition for the predefined route is determined, such as e.g. a minimum value for the loading capacity of the ramp. On the basis of the building model, at every point of the route it is possible to check whether the building data at the same point satisfy the boundary condition.

For this purpose, the model of the building, the route W and parameters of the mobile robot TS are transferred to a device 100 according to embodiments of the invention, comprising an input module 101, a deriving module 102, a checking module 103 and an output module 104. The modules of the device 100 are advantageously connected to one another via communication connections. The device 100 can for example be configured as software and be executed on a processor. A user or purchaser of a mobile technical system TS can thus check a planned route for the system in advance to establish whether the route is suitable for the mobile technical system. Furthermore, a supplier of a mobile technical system TS can check in advance whether a mobile transport system can actually navigate a route W in a building B and/or whether a transported product can actually be delivered on the predefined route W in line with safety provisions or delivery regulations.

The device 100 is configured so as to carry out steps of the method according to embodiments of the invention, as illustrated by way of example in FIG. 1. The device 100 can be directly connected to the mobile robot TS by way of a wireless communication connection C, such that the checking result can be communicated directly to a control unit of the mobile robot TS. The device 100 can in particular be coupled to a management system 200 of the building B and/or be integrated into the latter (not illustrated). By way of example, the model of the building can be provided by the management system 200.

The check of the route W may reveal, for example, that the latter is not suitable for the mobile robot TS, e.g. on account of a permissible total weight and/or on account of safety conditions. In this regard, by way of example, the device 100 and/or the management system 200 can be coupled to a path planning module (not illustrated) comprising path planning software, whereby an alternative route W' can be planned. FIG. 2 illustrates an alternative route W' via an elevator A. If the alternative route W' is positively validated by means of the device 100, this route W' can instead be released for the mobile robot TS and be implemented.

Furthermore, by means of the computer-implemented method according to embodiments of the invention, it is possible to determine an optimum route from a multiplicity of routes for a mobile technical system TS, wherein for a respective route the boundary conditions dependent on the parameters of the mobile technical system are compared with the building data along the respective route.

FIG. 3 schematically shows a further exemplary embodiment of the computer-implemented method according to embodiments of the invention. By way of example, a mobile transport device comprising a device 100 according to embodiments of the invention is shown as a mobile technical system TS. The transport device TS and/or the device 100 can be coupled to a management system 200 of the building B by way of a wireless or wired communication connection C. The management system 200 is coupled to the building B and can inter alia manage the computer-aided spatial model of the building BIM and provide it to the device 100 for read-in.

The transport system TS can be controlled by an operator or autonomously. The route W predefined for the transport system TS can be physically validated by the route W being checked in the device 100 on the basis of the building model BIM and depending on the boundary conditions given by the parameters of the transport system TS. In addition, by means of at least one sensor S, current location data or ambient data of the transport system TS can be detected and utilized when checking the route. By way of example, the transport system TS may transport a temperature-sensitive product, such that a boundary condition for the route may be a maximum temperature that must not be exceeded.

By means of at least one ambient sensor, e.g. a temperature or moisture sensor or a radar/ultrasonic sensor for checking a passageway, it is possible to carry out a current ambient measurement in the building B at at least one predefined point of the route and to take it into account when checking the route.

Depending on the result of the route check, the route can be released for the transport system TS. In the case of a negative checking result, by way of example, a warning message, such as e.g. a warning signal for an operator, can be output. In the case of an autonomous transport device TS, the device 100 can also be directly connected to a control unit of the transport device, such that the autonomous transport device TS can be directly stopped or braked or diverted.

FIG. 4 shows further exemplary embodiments of the invention. A management system 200 of a building B can comprise a device 100, i.e. the device 100 can be integrated for example as software in the management system 200. Furthermore, at least one sensor S coupled directly to the management system 200 can be installed in the building B. The sensor S can be a smoke detector, for example, which continuously monitors part of the building B and communicates the corresponding current ambient data in the building to the management system 200. In this regard, in the course of checking a route W for a mobile technical system TS, in the case of a fire, the current ambient data can be taken into account and replanning of the route can be instigated for example in the case of a negative checking result.

The management system 200 can communicate the current ambient data to the device 100, such that there it is possible to check the route W in respect of its implementability on the basis of the model of the building BIM. Furthermore, in the model of the building BIM, it is possible to define additional requirements of the building, such as escape routes, for example, which are intended to be taken into account in the case of a fire when checking the route W.

FIG. 5 shows a device 100 according to embodiments of the invention in a block illustration, the device being coupled to a management system 200 according to embodiments of the invention and a mobile technical system TS. The coupling can be configured for example in each case by way of a wireless or wired communication connection C or by way of a communication network.

The device 100 according to embodiments of the invention comprises an input module 101 for reading in a building model BIM, a route in the building for the mobile technical system TS and parameters of the mobile technical system TS. The input module 101 can for example be connected to a storage unit or database and retrieve therefrom the data relevant to the check of the route. The building model BIM can also be provided by the management system 200. On the basis of the parameters of the mobile technical system TS, at least one boundary condition for the route is derived in the deriving module 102.

The device 100 furthermore comprises a checking module 103 for checking the route in respect of suitability on the basis of the building model BIM and depending on the boundary conditions specific to the mobile technical system. By way of example, rules or checking specifications that can be taken as a basis for effecting the check of the route can be communicated to the checking module 103.

The result of the check can be output to the management system 200 and/or to the mobile technical system TS via the output module 104 of the device 100.

On account of the coupling of the management system 200, the device 100, the mobile technical system TS, and sensors in or on the building and/or mobile technical system, predefined routes for the mobile technical system can be checked and replanned, if appropriate, in real time.

Although the present invention has been disclosed in the form of preferred embodiments and variations thereon, it will be understood that numerous additional modifications and variations could be made thereto without departing from the scope of the invention For the sake of clarity, it is to be understood that the use of "a" or "an" throughout this application does not exclude a plurality, and "comprising" does not exclude other steps or elements.

The invention claimed is:

1. A computer-implemented method for checking a route in a building and controlling a mobile technical system, comprising:
    reading in a computer-aided spatial model of the building, comprising building data, a route for the mobile technical system in the building, and parameters of the mobile technical system,
    deriving a boundary condition for the route depending on the parameters of the mobile technical system,
    checking for a predefined point of the route on the basis of the model of the building to ascertain whether the building data satisfy the boundary condition at the predefined point of the route,
    and
    outputting a result of the check and controlling the mobile technical system,
    wherein, depending on the result of the check,
        at least parts of the route for the mobile technical system are released and/or
        a warning message is output and/or
        the mobile technical system is stopped and/or
        planning of an alternative route is instigated and/or
        an alternative route is output.

2. The computer-implemented method as claimed claim 1, wherein the mobile technical system and a management system of the building are coupled via a communication connection and data are exchanged via the communication connection.

3. The computer-implemented method as claimed in claim 1, wherein current ambient data in the building are detected by a sensor and the current ambient data are communicated to the management system of the building and the ambient data are verified with building data and/or taken into account when checking the route.

4. The computer-implemented method as claimed in claim 1, wherein
    data of the mobile technical system are detected by a sensor and
    these data of the mobile technical system are communicated to the management system and the data of the mobile technical system are taken into account when checking the route.

5. The computer-implemented method as claimed in claim 1, wherein
    checking the route is carried out in the management system of the building or on the mobile technical system and
    the result of the check is communicated to the management system of the building and/or by the mobile technical system and is output thereby.

6. The computer-implemented method as claimed in claim 1, wherein a computer-aided spatial model of the building is generated from a non-computer-aided model of the building and is provided.

7. A computer program product, comprising a non-transitory computer readable hardware storage medium having computer readable program code stored therein, said program code executable by a processor of a computer system to implement a method which is loadable directly into a programmable computer, comprising program code parts suitable for carrying out steps of a method as claimed in claim 1.

8. A computer-readable data carrier on which the computer program product as claimed in claim 7 is stored.

9. A device for checking a route in a building controlling a mobile technical system, comprising:
- an input module for reading in a computer-aided spatial model of the building, comprising building data, a route for the mobile technical system in the building, and parameters of the mobile technical system,
- a deriving module for deriving a boundary condition for the route depending on the parameters of the mobile technical system,
- a checking module for checking for a predefined point of the route on the basis of the model of the building that the building data satisfy the boundary condition at the predefined point of the route,
- an output module for outputting the result of the check and controlling the mobile technical system;

wherein, depending on the result of the check,
- at least parts of the route for the mobile technical system are released and/or
- a warning message is output and/or
- the mobile technical system is stopped and/or
- planning of an alternative route is instigated and/or
- an alternative route is output.

10. The device as claimed in claim 9, wherein the device is coupled to a management system of a building and/or to the mobile technical system.

11. The device as claimed in claim 9, which is configured so as to carry out the steps of a computer-implemented method for checking a route in a building for a mobile technical system, wherein
- the computer-aided spatial model of the building, comprising building data, the route for the mobile technical system in the building, and the parameters of the mobile technical system are read in,
- the boundary condition for the route is derived depending on the parameters of the mobile technical system,
- for the predefined point of the route on the basis of the model of the building the check is made to ascertain whether the building data satisfy the boundary condition at the predefined point of the route, and
- the result of the check is output and the mobile technical system is controlled, wherein, depending on the result of the check,
- at least parts of the route for the mobile technical system are released and/or
- a warning message is output and/or
- the mobile technical system is stopped and/or
- planning of an alternative route is instigated and/or
- an alternative route is output.

12. A management system of a building, wherein the management system comprises a device as claimed in claim 9.

13. The management system of a building as claimed in claim 12, wherein the management system is coupled to at least one sensor and/or to the mobile technical system a communication connection and is configured so as to carry out the steps of a method for checking a route in a building for a mobile technical system, wherein
- the computer-aided spatial model of the building, comprising building data, the route for the mobile technical system in the building, and the parameters of the mobile technical system are read in,
- the boundary condition for the route is derived depending on the parameters of the mobile technical system,
- for the predefined point of the route on the basis of the model of the building the check is made to ascertain whether the building data satisfy the boundary condition at the predefined point of the route, and
- the result of the check is output and the mobile technical system is controlled, wherein, depending on the result of the check,
- at least parts of the route for the mobile technical system are released and/or
- a warning message is output and/or
- the mobile technical system is stopped and/or
- planning of an alternative route is instigated and/or
- an alternative route is output.

* * * * *